Figure 1:
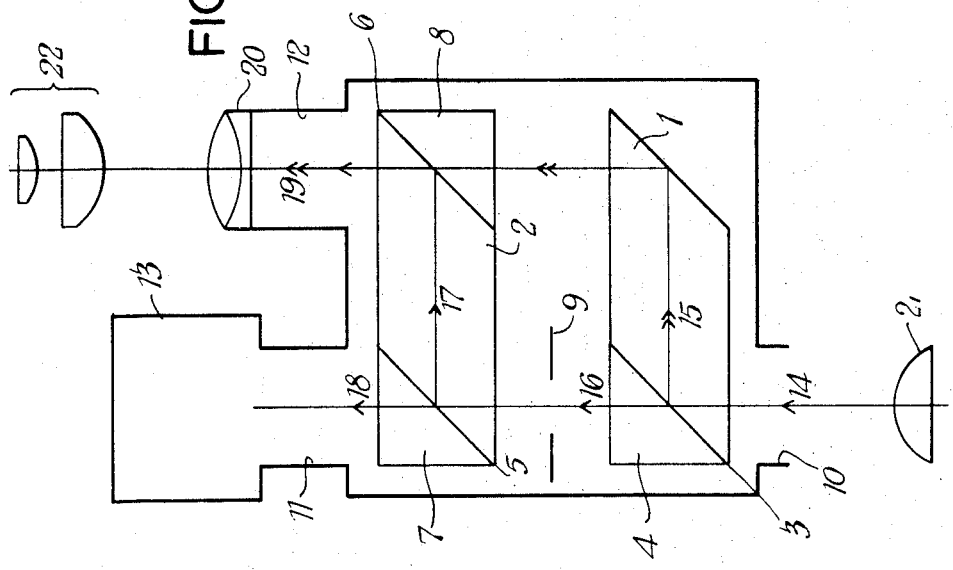

United States Patent [19]
Smith

[11] 3,820,870
[45] June 28, 1974

[54] PHOTOMETRIC INSTRUMENTS
[75] Inventor: Francis Hughes Smith, York, England
[73] Assignee: Vickers Limited, London, England
[22] Filed: Jan. 8, 1973
[21] Appl. No.: 321,932

[30] Foreign Application Priority Data
Jan. 14, 1972  Great Britain..................... 1949/72

[52] U.S. Cl..................... 350/33, 350/17, 350/173, 350/174
[51] Int. Cl. .......................................... G02b 21/18
[58] Field of Search ................ 350/17, 33, 173, 174

[56] References Cited
UNITED STATES PATENTS
| 2,379,153 | 6/1945 | Holste | 350/17 |
| 2,699,092 | 1/1955 | Rantsch | 350/33 X |
| 3,326,079 | 6/1967 | Dyson et al. | 350/173 X |
| 3,421,806 | 1/1969 | Weber | 350/19 |

Primary Examiner—David H. Rubin
Attorney, Agent, or Firm—Pennie & Edmonds

[57] ABSTRACT
A photometric instrument comprises an objective which forms an input light beam bearing an image of an object, a photodetector, and a housing between the objective and the photodetector. The housing has an inlet aperture, for admitting the input light beam from the objective and contains a first beam-splitter mounted to receive the input light beam and split it into first and second beams. A diaphragm is mounted in the path of the first beam for passing those rays of that beam which emanate from a limited area of the object and for blocking those rays of the first beam which emanate from regions of the object outside of that limited area. A second beam-splitter receives the passed rays of the first beam and divides them into a first pencil of light rays directed towards the photodetector by way of a first output aperture of the housing and a second pencil of light rays directed towards a beam-combiner. The beam-combiner combines the second pencil of light rays with the second beam formed by the first beam-splitter to provide a composite output beam which is directed towards a second outlet aperture of the housing and which can be brought to a focus to produce an image of the object in which the limited area of the object appears with increased intensity as compared with the regions outside the limited area.

6 Claims, 4 Drawing Figures

PATENTED JUN 28 1974　　　　　　　　　3,820,870

SHEET 1 OF 3

PHOTOMETRIC INSTRUMENTS

The invention relates to photometric instruments.

In photometric microscopy it is usually necessary to ensure that the light which reaches the photodetector is derived from a precisely defined area of the object under examination. This is easily achieved by placing a selectable diaphragm at an orthoscopic image plane upstream of the photodetector (by "upstream" is meant optically before, and analogously by "downstream" is meant optically after). However, in order to ensure that the area of interest is correctly isolated by the diaphragm, it is necessary to observe the object's image and the diaphragm simultaneously.

If one merely inspects the image at a position downstream of the diaphragm then one sees only the isolated area, because the remainder of the object field is masked from view. Known solutions to this problem are subject to disadvantages. Thus, if an illuminated image of the diaphragm is superimposed upon the field of view (e.g., by a beam-splitter) the selected area is less clearly seen because of veiling glare from the externally illuminated diaphragm. If this effect is avoided by making the diaphragm in the form of a mirror pierced with holes which permit passage of light to the photodetector, then this obviously prevents the use of an iris diaphragm.

According to the present invention there is provided an optical device, having an inlet aperture for admitting an input light beam from an object viewed through the device when it is in use, comprising a first beam-splitter mounted to receive the said input light beam, from the inlet aperture, and to split it into first and second beams, aperture-defining diaphragm means mounted in the path of the first beam for passing those rays of that beam which emanate from a limited area of the object and for blocking those rays of the first beam which emanate from regions of the object outside the said limited area, a second beam-splitter mounted downstream of the diaphragm means for receiving the passed rays of the first beam and dividing them into a first pencil of light rays, directed towards a first outlet aperture of the device, and a second pencil of light rays, and beam-combining means mounted to receive the said second beam and the said second pencil and to provide therefrom a composite output beam which is directed towards a second outlet aperture of the device and which can be brought to a focus to produce an image of the said object, in which image the said limited area of the object appears with increased intensity as compared with the said regions outside the said limited area.

Figure 2:
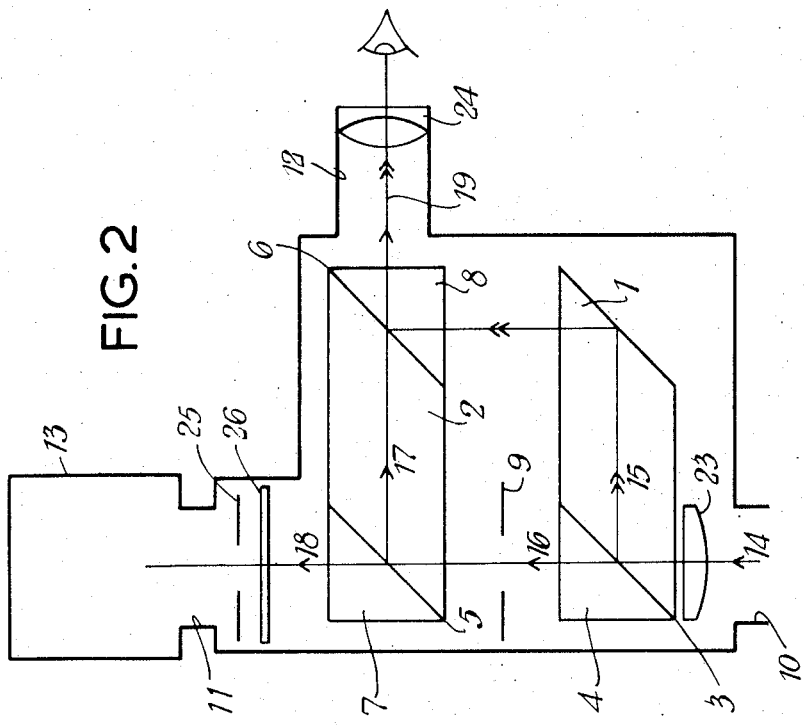
Figure 3:
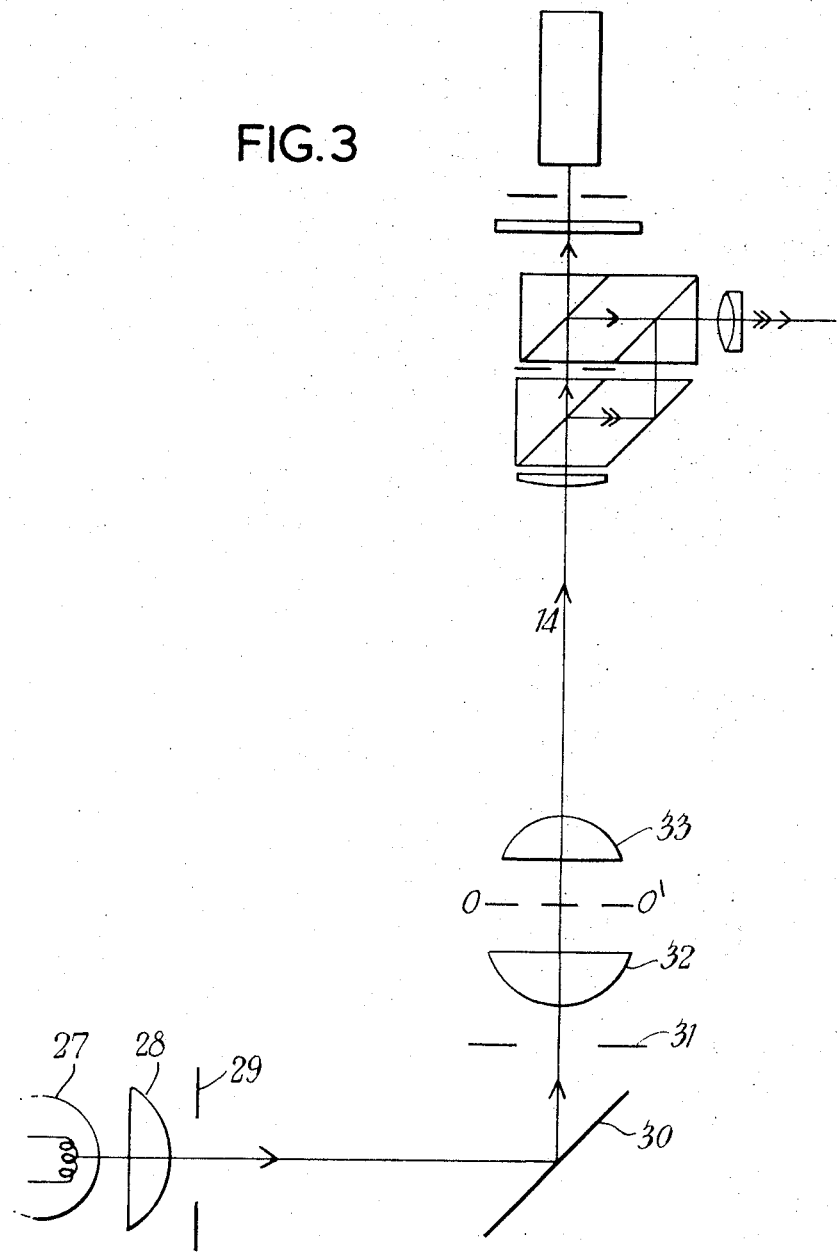
Figure 4:
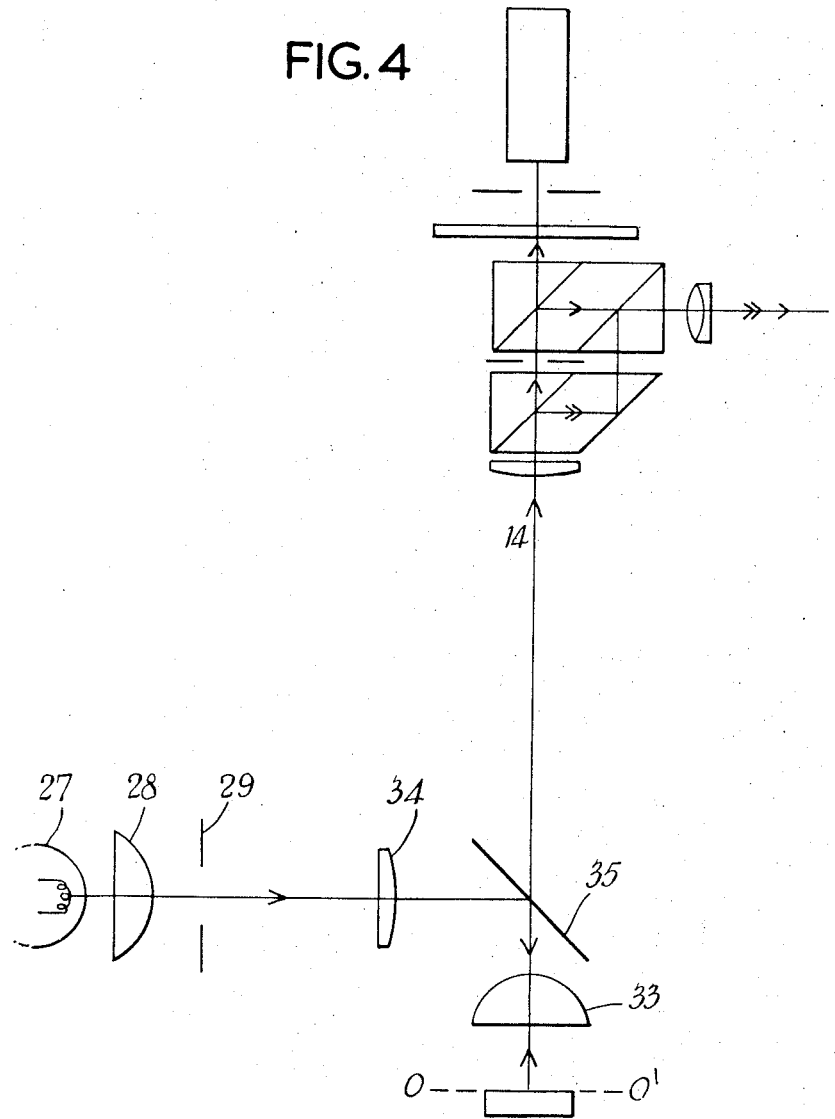

For a better understanding of the invention, and to show how the same may be carried into effect, reference will now be made, by way of example, to the accompanying diagrammatic drawings, in which:

FIG. 1 shows an optical device embodying the present invention in combination with a photodetector and other components of a photometric microscope, FIG. 2 shows a second optical device embodying the present invention in combination with a photodetector, FIG. 3 shows the combination of FIG. 2 mounted as part of a transmitted-light microscope, and FIG. 4 shows the combination of FIG. 2 mounted as part of a reflected-light microscope.

In the different figures like references denote like components.

The device illustrated in FIG. 1 comprises two rhomboid prisms 1 and 2. One end face of the prism 1 is provided with a beam-splitting coating 3 between that end face and the hypotenuse face of a 45° - 45° - 90° prism 4. The two end faces of the other rhomboid prism 2 are provided with respective beam-splitting coatings 5 and 6, between those faces and the hypotenuse faces of respective 45° - 45° - 90° prisms 7 and 8. Thus, the device comprises a prism assembly 1 + 4 and a prism assembly 2 + 7 + 8. Between these two prism assemblies is a diaphragm 9 defining an aperture which lies on an optical axis defined by an inlet aperture 10 of the device and a first outlet aperture 11 thereof. The photo-detector, marked 13 in the drawings, is mounted to receive light leaving the device by way of the aperture 11. The device also has a second outlet aperture 12 in which an image-relaying lens 20 is mounted. In use the illustrated device is mounted between the objective 21 and eyepiece 22 of the photometric microscope, light passing through the objective from an object under examination at 0 - 0' providing an input light beam 14 to the device. The eyepiece is mounted for viewing an image formed by means of the imagerelaying lens from light leaving the device by way of the aperture 12. The eyepiece could be replaced by a binocular viewing head if so desired.

On entering the device the input light beam 14 is divided at the coating 3 into a reflected beam 15 and a transmitted beam 16. The transmitted beam 16 forms an image of the object in the plane of the diaphragm 9, and accordingly the aperture in the diaphragm only passes light rays emanating from a limited area of the object, the size of that area being determined by the size of the aperture. The passed rays of the beam 16 fall upon the coating 5 and are divided into a reflected ray pencil 17 and a transmitted ray pencil 18 which is directed out of the device by way of the aperture 11. The reflected beam 15 from the coating 3 passes through the prism 1 to the opposite end face thereof, whereat it is totally reflected towards the coating 6. The beam 15 is partially transmitted by the coating 6. The ray pencil 17 passes from the coating 5 through the prism 2 towards the coating 6 whereby it is partially reflected. The transmitted part of the beam 15 is thus combined at the coating 6 with the reflected part of the pencil 17 to produce a composite output beam 19, directed out of the device by way of the aperture 12. The composite beam is brought to a focus by means of the image-relaying lens, and at this focus an image which can be viewed through the eyepiece is formed. An observer of the image sees a diaphragmed field super-imposed upon a clear and undiaphragmed one. Consequently, the limited area of the object defined by the aperture in the diaphragm merely appears brighter than does the remainder of the field and image detail is therefore preserved. The degree of enhancement of intensity of the diaphragmed area with respect to the regions outside that area depends upon the relative reflectivities of the relevant beam-splitting coating. These reflectivities may be set at the manufacturing stage or they may be made manually adjustable using a polarizing system. For example the beam-splitting coatings may take the form of a dielectric polarizing beam-splitting coating so that their transmission/reflection ratios can be controlled by adjusting the polarization azimuths of the incident and/or transmitted beams. Alternatively, the prisms could be sufficiently elongated in a direction perpendicular to the plane of the Figure to provide space for a plurality of beam-splitting coatings distributed along the prisms and having different transmission/reflection ratios. The different coatings could then be selected by displacing the prisms in the direction of elongation.

The FIG. 2 device is similar to the FIG. 1 device both in construction and in function, in that it is for use as part of a photometric microscope. The main difference between the two devices is that an eyepiece is incorporated in the FIG. 2 device for viewing the plane of the diaphragm 9 and the equivalent plane in the path of the reflected beam 15. Accordingly the FIG. 2 device does not require use of an image-relaying lens. The eyepiece comprises a field lens 23 and an eye lens 24. The FIG. 2 device also comprises a diaphragm 25 mounted in the path of the transmitted ray pencil 18 for preventing stray light from entering the photodetector. Such stray light may enter the casing containing the device by way of the aperture 12 and, after multiple reflections, be directed towards the aperture 11, but the diaphragm 22 ensures that only light rays travelling towards the aperture 11 within a narrow range of directions actually reach the aperture 11. The diaphragm 25 defines the narrow range of allowed directions better the smaller is its aperture, and since it is necessary that the diaphragm 25 should not block light of the beam 16 that has passed through the diaphragm 9 it follows that the diaphragm 25 should be positioned where the ray pencil 18 is at its narrowest. Generally speaking, the image-bearing light beam of a microscope is at its narrowest in the plane of the exit pupil of the microscope's objective lens and in planes conjugate with the exit pupil plane. Accordingly, the field lens 23 is employed to image the exit pupil of the photometric microscope's objective into the plane of the diaphragm 25.

Furthermore, the FIG. 2 device is fitted with a spectral filter 26 for isolating from the ray pencil 18 the wavelength at which the photodetector 13 is required to operate. Finally, whereas in the case of the FIG. 1 device the output beam 19 passes vertically through the aperture 12, in the case of the FIG. 2 device the output beam 19 is made up of the transmitted part of the pencil 17 and the reflected part of the beam 15 and the aperture 12 is arranged to allow the beam 19 to leave the device horizontally. The reason for this is that it is more convenient for a user of a microscope to have a horizontal viewing direction than a vertical viewing direction. It would, of course, be possible to provide a viewing direction between the two extremes of FIGS. 1 and 2 by appropriately reflecting the beam 19.

Clearly the diaphragm 9 of either illustrated device may be an iris diaphragm, permitting selective variation of the size of the aperture and thus of the limited area isolated by the diaphragm for passage to the photodetector. Alternatively, it may be desired to carry out an investigation employing different accurately known aperture sizes, for example for accurate comparison of different objects, and in this case the diaphragm 9 may be in the form of a slide formed with a plurality of apertures of different size, each accurately known.

FIG. 3 shows a transmitted-light microscope equipped with a combination as shown in FIG. 2 instead of a conventional eyepiece. The microscope comprises a lamp 27, a lamp condenser 28 and a field diaphragm 29 which is employed to confine the illumination provided by the lamp to that region of the specimen, in the plane 0 - 0', which is under examination. The horizontal illuminating beam from the field diaphragm 29 is reflected into the vertical direction by a substage mirror 30 and passes through a substage iris diaphragm 31 and a substage condenser 32 to the plane 0 - 0'. The function of the diaphragm 31 is to enable the effective numerical aperture of the illuminating cone produced by the condenser 32 to be varied. The beam passes from the plane 0 - 0' vertically upwards through an objective lens 33 to enter the FIG. 2 device by way of the field lens 23. An image of the specimen in the plane 0 - 0' is formed at the plane of the diaphragm 9 and at the aforesaid equivalent plane in the path of the reflected beam 15.

FIG. 4 shows a reflected-light microscope equipped with a combination as shown in FIG. 2 instead of a conventional eyepiece. The main distinction between the FIG. 4 microscope and the FIG. 3 microscope is that whereas in the case of the FIG. 3 microscope the horizontal illuminating beam from the lamp 27 is directed to the mirror 30 which lies below the plane 0 - 0', in the case of the FIG. 4 microscope the horizontal illuminating beam is directed through a corrector lens 34 towards a partially transparent reflector 35 which reflects the beam vertically downwards through the objective lens 33, which serves also as a condenser, to illuminate the specimen from above. Light reflected from the specimen passes back through the objective lens 33 and some of it is transmitted by the partially transparent reflector 35 to enter the FIG. 2 device by way of the field lens 23. This reflected light which is transmitted by the reflector forms an image of the specimen at the plane of the diaphragm 9 and at the aforesaid equivalent plane in the path of the beam 15. The corrector lens 34 is provided in order to project the field diaphragm 29 into precise conjugate relationship with the final image plane of the objective lens 33.

It will be appreciated that the FIG. 1 or 2 device may be used with a microscope equipped with a conventional viewing head, whether monocular or binocular, by including a prism system arranged to direct the image-bearing beam from the objective either to the viewing head or to the FIG. 1 or 2 device. Alternatively, the microscope may include a beam-splitter which simultaneously directs light to both the viewing head and the FIG. 1 or 2 device.

I claim:

1. A photometric instrument comprising:
   a. an objective for forming an input light beam bearing an image of object under examination;
   b. a housing defining an inlet aperture arranged to admit said input light beam, and first and second outlet apertures for enabling light to leave the housing;
   c. a photodetector mounted to receive light which leaves the housing by way of said first outlet aperture;
   d. a first beam-splitter mounted in said housing to receive said input light beam, from the inlet aperture, and to split it into first and second beams each bearing an image of the object;
   e. aperture-defining diaphragm means mounted in said housing in the path of the first beam, at a position at which said objective forms a real image of the object, for passing those rays of that beam which emanate from a limited area of the object and for blocking those rays of the first beam which emanate from areas of the object outside said limited area;

f. a second beam-splitter mounted in said housing downstream of the diaphragm means for receiving the passed rays of the first beam and dividing them into a first pencil of light rays, directed towards said first outlet aperture, and a second pencil of light rays; and g. beam-combining means mounted in said housing to receive said second beam and said second pencil and to provide therefrom a composite output beam which is directed towards said second outlet aperture and which can be brought to a focus to produce an image of said object, in which image said limited area of the object appears with increased intensity as compared with said regions outside said limited area.

2. An instrument as claimed in claim 1, wherein said diaphragm means comprise an iris diaphragm for permitting the size of the aperture defined thereby to be selectively varied.

3. An instrument as claimed in claim 1, wherein said diaphragm means comprise a member defining a plurality of apertures of different respective sizes, said member being mounted so as to be movable to position any selected one of said apertures in the path of said first beam.

4. An instrument as claimed in claim 1, further comprising an image-relaying lens mounted to receive said composite output beam and bring it to a focus, to produce said image in which said limited area of the object appears with increased intensity as compared with said regions outside said limited area, a finite distance downstream of the image-relaying lens.

5. An instrument as claimed in claim 4, further comprising an eyepiece mounted further downstream of the image-relaying lens than said focus, for use in viewing said image in which said limited area of the object appears with increased intensity as compared with said regions outside said limited area.

6. An instrument as claimed in claim 1, further comprising a stop mounted in the path of said first pencil for preventing light rays other than those of said first pencil from reaching the photodetector, and a field lens mounted upstream of said diaphragm means for forming an image of the exit pupil of the objective at the position of said stop.

* * * * *